United States Patent [19]
Grout

[11] Patent Number: 5,607,512
[45] Date of Patent: Mar. 4, 1997

[54] ELECTRICAL CONTACT CLEANER AND METHOD

[75] Inventor: Kenneth M. Grout, Littleton, N.H.

[73] Assignee: Tender Corporation, Littleton, N.H.

[21] Appl. No.: 204,464

[22] Filed: Feb. 28, 1994

Related U.S. Application Data

[62] Division of Ser. No. 924,680, Aug. 3, 1992, abandoned.

[51] Int. Cl.$^6$ ................................................. B08B 7/00
[52] U.S. Cl. ........................... 134/6; 134/2; 134/19; 134/20; 134/26; 134/38; 134/39; 134/40; 134/41; 134/42
[58] Field of Search ......................... 134/2, 38, 40, 134/42, 6, 26, 39, 19, 20, 41; 252/170, DIG. 8; 15/256.52, 104.94, 209.1, 437

[56] References Cited

U.S. PATENT DOCUMENTS

| | | | |
|---|---|---|---|
| 938,846 | 11/1909 | Ginn | 15/209.1 |
| 1,105,457 | 7/1914 | Roberts | 15/209.1 |
| 1,297,675 | 3/1919 | Garvey | 15/209.1 |
| 1,935,024 | 11/1933 | Gaskins | 15/209.1 |
| 2,442,051 | 5/1948 | Luscri | 15/209.1 |
| 2,541,459 | 2/1951 | Bernard | 15/209.1 |
| 3,041,649 | 7/1962 | Isenhour | 134/6 |
| 3,071,479 | 1/1963 | Fulenwider | 106/10 |
| 4,578,215 | 3/1986 | Bradley | 252/514 |
| 5,080,722 | 1/1992 | Englert et al. | 134/26 |
| 5,148,572 | 9/1992 | Wells et al. | 15/118 |
| 5,181,292 | 1/1993 | Aghachi | 15/236.08 |
| 5,234,506 | 8/1993 | Winston et al. | 134/40 |
| 5,238,504 | 8/1993 | Henry | 134/40 |
| 5,296,041 | 3/1994 | Vinci et al. | 134/40 |

*Primary Examiner*—Jan H. Silbaugh
*Assistant Examiner*—Robin S. Gray
*Attorney, Agent, or Firm*—Testa, Hurwitz & Thibeault, LLP

[57] ABSTRACT

A method for maximizing electrical contact between contact surfaces, consisting essentially of a volatile cleaning agent and an oxidation occluding agent. The method uses an applicator device for cleaning and protecting electrical contact surfaces utilizing this composition.

7 Claims, 1 Drawing Sheet

ELECTRICAL CONTACT CLEANER AND METHOD

This is a divisional of application Ser. No. 07/924,680 filed on Aug. 3, 1992, now abandoned.

BACKGROUND OF THE INVENTION

This invention relates to compositions useful for cleaning electrical contact surfaces. More particularly, the invention is directed to methods and compositions for maximizing electrical contact between contacting metal surfaces, particularly between the battery contacts in electrical devices such as portable lights, calculators, mechanized toys and games and the like.

It is well known that the exposed surfaces of most metals tend to attract oxygen atoms, leading to the formation of metal oxides on the exposed surface. It also is known that the spontaneous growth of such an oxide film on an exposed metal surface can force its way between two contacting surfaces, particularly when contact pressure between the two metals is light, such as between disposable batteries and their spring mount electrical contacts. Because metal oxides are poor conductors (non-conductors or, at best, semi-conductors), an interfering oxide film between electrical contact surfaces can reduce the area over which good electrical contact can be made, progressively degrading and eventually precluding electrical conduction.

It is an object of this invention to provide a composition and method for cleaning metal contact surfaces so as to effectively establish and maintain maximal electrical contact between electrically conducting surfaces, and to protect these surfaces from subsequent oxidation. It is another object of this invention to provide an inexpensive, reuseable device for applying the composition of the invention to terminals of disposable batteries and for carrying out a preferred embodiment of the method of this invention.

These and other objects and features of the invention will be apparent from the description, drawings, and claims which follow.

SUMMARY OF THE INVENTION

The invention provides a composition comprising a mixture or solution of a volatile metal cleaning agent and an oxidation occluding agent. The composition is useful for restoring and preserving maximal electrical contact between two metal surfaces when applied to one or both surfaces.

The composition is applied to the metal surface preferably simultaneously with or after the surface has been abraded. The action of abrading the metal contact surface serves to dissociate metal oxides and/or other contaminants from the metal surface. The volatile cleaning agent displaces the abraded material from the metal surface, and the oxidation occluding agent forms a protective coating over the cleaned metal surface, substantially inhibiting reoxidation of the exposed metal. The composition of the invention allows electrical contacts to be cleaned quickly, easily and safely, and without the need for granular abrasives.

Metal cleaning agents which can be used in the present composition include any volatile solvents which are compatible with the oxidation occluding agent of choice. Volatile organic solvents such as hydrocarbon solvents are preferred for this purpose. Hydrocarbon solvents which are particularly preferred include one or more terpene solvents, such as for example, limonene.

Oxidation occluding agents which can be used include those compatible with the desired cleaning agent, and which are capable of forming a protective coating on the metal contact surface. Currently preferred occluding agents include waxes which may be made up of one or more different wax components. For example, useful waxes include synthetic waxes; ester-type waxes such as carnauba wax and candelilla wax; hydrocarbon waxes such as beeswax, and natural or synthetic paraffins.

The composition may further contain additives, including fragrances and/or coloring agents. For example, coloring agents capable of coloring the treated electrical contact surfaces may be added, thereby allowing the user to identify the metal surface as treated.

By varying the components of the composition and their concentrations, the composition may be a waxy solid, paste, or liquid. When the composition is a solid or paste, it can be applied to the metal contact surface with a cloth or other material. The cloth preferably has a rough or abrasive surface so that when it is used to apply the composition, it simultaneously abrades, cleans and coats the surface. If the composition is liquid, it is first absorbed into a porous or wicking material which is capable of absorbing the liquid and retaining it therein, and which preferably acts as an abrasive. The metal surface then is rubbed with the impregnated material to abrade the metal surface and to simultaneously apply the absorbed liquid composition to the surface, thereby abrading, cleaning and protecting the contact surface in a single step. It will be apparent to those skilled in the art that the metal contact surface also can be abraded by rubbing the surface with a sufficiently stiff abrasive material prior to the application of the composition of this invention.

In a particularly preferred embodiment of the invention, the composition is applied to a battery terminal and/or its mating contact in a battery-powered light, calculator, electronic camera or the like, by means of a specially designed applicator device. The device comprises a housing defining a reservoir for holding the composition of the invention in liquid form, a wick which is in communication with the reservoir and is itself rubbing surface protruding from the housing, and a removable cap means which interfits with the housing, surrounds the wick and rubbing surface, and serves to prevent evaporation of the volatile cleaning agent from the wick. Preferably, this cap is adapted to fit over the wick and the reservoir. The cap also may be adapted to interfit with a hole in the end of the housing opposite the wick to prevent misplacement when the device is in use.

BRIEF DESCRIPTION OF THE DRAWINGS

The foregoing and other objects of this invention, the various features thereof, as well as the invention itself, may be more fully understood from the following description, when read together with the accompanying drawings, in which.

Like-referenced characters in the respective drawn figures indicate corresponding parts.

DETAILED DESCRIPTION OF THE INVENTION

Figure 1:
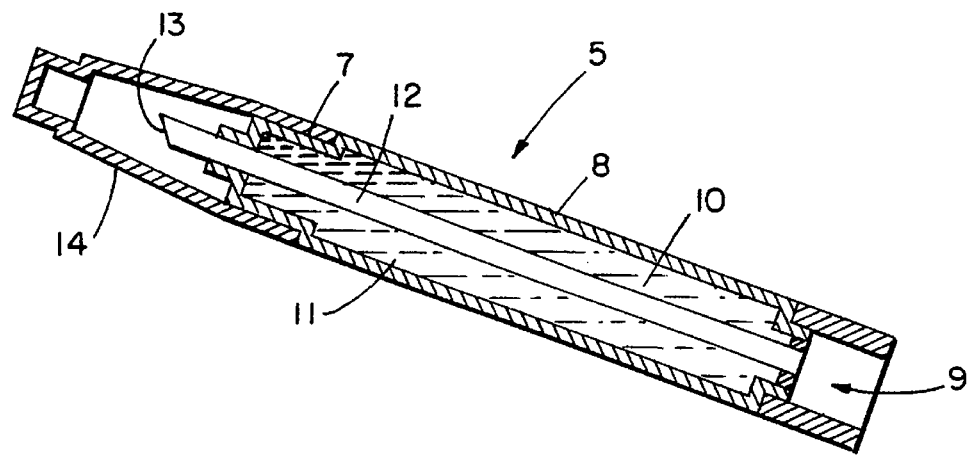
FIG. 1 is a longitudinal cross section of a preferred embodiment of the applicator of the invention.
Figure 2:
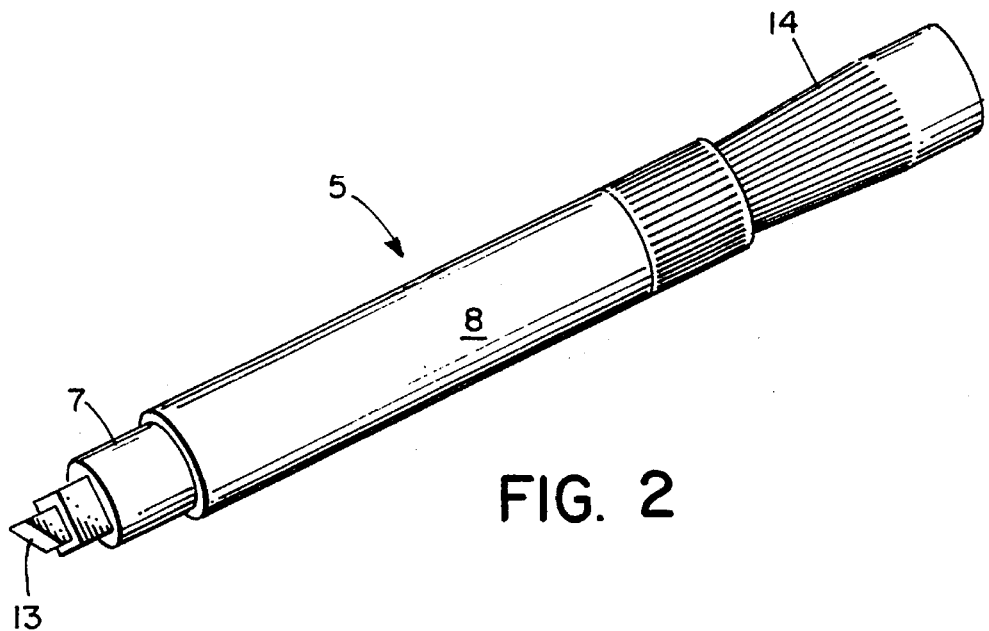
FIG. 2 is a perspective view of the applicator of the invention ready for use.

The composition of the present invention cleans electrical contact surfaces and protects the surfaces from oxidation thereby maintaining maximal electrical contact. The composition comprises a volatile cleaning agent capable of removing from the metal surface metal oxides and other contaminants which have been dissociated from the metal contact surface by abrasion, and an oxidation occluding agent capable of forming a protective coating over the contact surface, thereby inhibiting reoxidation and the buildup of insulative oxides on the cleaned metal surface.

The volatile cleaning agent can be any agent which is compatible with the oxidation occluding agent and which has a sufficiently low vapor pressure that the solvent evaporates shortly after application. Preferably, the cleaning agent also serves as a vehicle for application of the oxidation occluding agent and is mutually miscible with the occluding agent. Volatile organic solvents such as hydrocarbon solvents are useful as cleaning agents. Particularly preferred hydrocarbon solvents include one or more terpene solvents. A mixture of solvents having different evaporation rates may be used to adjust the rapidity with which the solvent evaporates from the composition during its application.

Terpenes are organic materials which are found in nature in the essential oils of many plants. Terpenes have carbon skeletons made up of isoprene

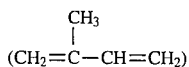

units joined together in a regular, head-to-tail configuration. Terpene compounds include, for example, limonene, citronellol, T-terpinene, isoborneol, camphene and squalene. Terpenes can be monocyclic (e.g., dipentene), dicyclic (e.g., pinene) or acyclic (e.g., myrcene). Terpenes which are particularly useful include limonene and mixtures including limonene. Limonene ($C_{10}H_{16}$) occurs naturally in oils found in lemons, caraway and oranges, for example. Terpene solvents are biodegradable and non-toxic.

The oxidation occluding agent can be any agent that is compatible with the cleaning solvent, and which can be applied readily to a contact surface by rubbing. It should be adherent to metal surfaces, capable of forming a coating on the metal surface and relatively nonvolatile. The coating formed by the occluding agent should be a substantially continuous coating or film on the metal surface capable of protecting the exposed metal surface from atmospheric oxygen and contaminants without interfering with electrical conduction. It need not itself be an electrical conductor.

Waxes, oils and mixtures thereof are particularly useful as oxidation occluding agents for use in the composition of this invention. The occluding agent may contain one or more waxes and/or oils depending on the desired form of the composition, and on the type of cleaning solvent used. Useful waxes include hydrocarbon waxes such as beeswax and paraffins (natural or synthetic); ester-type waxes such as carnauba and candelilla waxes; and synthetic waxes such as polyethylene waxes. Useful oils include, for example, mineral oil and drying oils such as tung oil and linseed oil.

A formula for a composition made in accordance with the principles of the present invention and establishing the range of the constituents is as follows (all percentages are by weight unless otherwise indicated):

| | |
|---|---|
| volatile cleaning agent | 20–99% |
| oxidation occluding agent | 1.0–80% |

The composition preferably comprises from about 10% to about 50% occluding agent, with the balance being comprised of the volatile cleaning agent.

It will be readily understood that the above formula may be varied appreciably, depending, for example on the nature of the components used, and on the desired form of the final product. For example, in one embodiment of the invention, the composition may be formulated as a paste. Here, the preferred amounts of oxidation occluding agent to cleaning agent is about 67% occluding agent to about 33% cleaning agent. The paste may be prepared, for example, by blending the occluding agent (e.g., a wax or mixture of oils and waxes) in the cleaning agent solvent at a temperature above the melting point of the wax and below the boiling point of the solvent. Upon cooling, the wax precipitates from the solution and forms a matrix of amorphous crystal-like structures which entrap the solvent. A small amount of the paste then may be applied to a battery contact terminal surface and/or the mating battery terminals of an electrical device with a cloth or other flexible material. The action of rubbing the paste on the metal surface with the cloth releases the solvent from the wax matrix, allowing it to clean the metal surface. The rubbing or abrading action serves to distribute the wax over the contact surface in a thin continuous coating.

Where a fluid composition is desired, a smaller ratio of occluding agent to solvent is suggested (e.g., about 25% occluding agent to about 75% cleaning agent). Optionally, a combination of occluding agents can be used, preferably a combination comprising one or more waxes and oils. For example, an oil to enhance fluidity and reduce viscosity may be used in combination with a "soft" wax to provide a durable coating. Mineral oil is preferred for this purpose. Preferred component ratios for liquid formulations are about 33% occluding agent about to 67% cleaning agent, however, higher amounts of occluding agent can be used as long as the composition is still wickable. A fluid composition may be formed essentially in the same way as a paste composition, by, for example, combining the occluding agent with the solvent at an elevated temperature, preferably stirring the solution as it cools to maintain a single phase solution.

In addition to the two essential components, the composition may contain various additives, including fragrances and/or coloring agents capable of staining or coloring-treating metal surfaces.

The composition of this invention is used in a method for enhancing and maintaining electrical contact between two or more contact surfaces, typically battery terminals and their mating contacts in a battery-powered device. The method is carried out by abrading one or more of the surfaces, preferably by rubbing the surface with a cloth or other fibrous material of sufficient stiffness to dislocate any metal oxides, dust and grit associated with the contact surface. The surface then is cleaned and protected by applying and rubbing the composition of this invention on the abraded surface. As indicated earlier, the steps of abrading the metal and applying the composition may be, and preferably are, performed as a single step. The treated contact surface then is placed in contact with its reciprocal contact surface. Cleaning and coating the exposed contact surface serves both to establish a good electrical connection and to reduce substantially the opportunity for subsequent metal oxide formation, thereby maximizing and helping to maintain electrical contact between the surfaces.

In another aspect, the invention is embodied as an applicator device 5 shown in the drawing. The device may be better understood by referring to FIG. 1, wherein a generally cylindrical, hollow housing 8, easily hand-held, defines a wicking reservoir 10 which contains the composition of this invention 11 in liquid form. Housing 8 defines a hole 9 in its base and a sealing surface 7 adapted to interfit with a cap 14. The reservoir 10 further contains a porous wicking material 12 capable of absorbing and retaining the composition among its porous interstices. The wicking material 12 comprises a material of sufficient stiffness such that, when rubbed against a metal contact surface, it is capable of abrading the surface sufficiently to dislocate any associated metal oxides. Wick 12 may be fabricated from synthetic and/or natural felts, intertangled cellulosic fibers, and similar known wicking materials. Wick 12 preferably is made of polyester felt. The housing and other parts preferably are molded plastic such as, for example, high density polyethylene. Wick 12 protrudes from the housing 8 and terminates at a rubbing surface 13, here defined by a flat, bevel cut end of wick 12. The applicator further comprises a removable cap 14 capable of substantially preventing evaporation of the volatile solvent when interfitted with the housing about the protruding wick 12 at sealing surface 7. In a particularly preferred embodiment of the device, the removable cap is adapted to be held in the hole 9 in the base of the housing 8 when not in use. The method of the invention may be practiced conveniently by removing cap 14, manually rubbing the contact to be treated with rubbing surface 13, and then replacing the cap until the next use.

EQUIVALENTS

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for cleaning and coating electrical contact surfaces of members selected from the group consisting of batteries and battery mating contacts, comprising the steps of:

contacting said electrical contact surfaces with an applicator, said applicator comprising a housing defining a wicking reservoir holding a liquid cleaning composition therein, said composition comprising a volatile cleaning agent and an oxidation-occluding agent; a porous, abrasive material in the form of a wick, said wick having a first portion in direct contact with said composition within said wicking reservoir for wicking said composition to a second portion of said wick protruding from an opening in said housing; and a cap which interfits with said housing, said method including rubbing said second portion against said electrical contact surfaces to abrade said electrical contact surfaces and apply said composition to clean and coat said electrical contact surfaces, thereby enhancing electrical contact and connection between said contact surfaces.

2. The method according to claim 1, wherein said volatile cleaning agent is a hydrocarbon.

3. The method according to claim 2, wherein said hydrocarbon is a terpene.

4. The method according to claim 1, wherein said oxidation-occluding agent comprises a wax.

5. The method according to claim 4, wherein said wax is selected from the group consisting of Carnauba wax, Candelilla wax, and beeswax.

6. The method according to claim 1 wherein said oxidation-occluding agent comprises an oil.

7. The method according to claim 1, wherein said oxidation-occluding agent comprises a mixture of an oil and a wax.

* * * * *